Feb. 6, 1962 S. T. WILLIAMS 3,019,832
LOW BEND, TUBELESS TIRE VALVE STEM
Filed Nov. 30, 1956

INVENTOR
SELDEN T. WILLIAMS
BY
Churchill, Weymouth & Engel
ATTORNEYS.

United States Patent Office 3,019,832
Patented Feb. 6, 1962

3,019,832
LOW BEND, TUBELESS TIRE VALVE STEM
Selden T. Williams, Bellerose, N.Y., assignor to Scovill Manufacturing Company, Waterbury, Conn., a corporation of Connecticut
Filed Nov. 30, 1956, Ser. No. 625,261
5 Claims. (Cl. 152—427)

The present invention relates to valve stems for use in inflating tubeless tires, and more particularly to such valve stems intended for mounting on truck and bus tire rims.

Conventional truck and bus tire valve stems have a long tubular shank and are made in a group of standard lengths adapted to be bent to meet substantially all truck and bus requirements. Such valve stems can be bent by the tire manufacturer or at service stations to correctly fit standard wheel and rim combinations on which the inner tube to which the valve stem is attached may be used. The stems are usually first bent at substantially a right angle in proximity to the base portion and then formed with a second bend between the first bend and the nipple end of the shank portion. These valve stems cannot be bent in production or in the field to produce a sufficiently low radial height at the base portion to clear brake drums on certain truck applications and, where such valve stems are to be used on tubeless tires the problem of obtaining an air-tight seal with the wheel rim necessitates a still greater length of stem projection through the rim. Furthermore, the trend toward larger diameter brakedrums, coupled with the fact that bottom hole mounting of valves will become standard, makes the radial height of a bent valve an important factor, especially since low radial height permits smaller clearance between the brake drum and the wheel rim, a condition which appeals to truck manufacturers. Not only did the advent of the tubeless tire and its application to truck and bus rims leave the problem of reducing the length of the stem portion adjacent the base to clear the brake drum unsolved, but it also presented additional problems such as obtaining and maintaining a leak-tight seal between the valve stem and the rim and making such valve stems removable and replaceable in the event of damage thereto.

In my copending application, Serial No. 560,325, filed January 20, 1956, now Patent No. 2,864,426, I have disclosed one solution of the problem by making the base portion of the valve stem separate from the tubular shank portion.

Where the base portion and tubular shank portion are integrally formed, a bend must be made in the shank portion and the radius of the bend will effect the radial height of the valve stem, hence a bend of minimum radius is desirable. However, too sharp a bend results in the formation of cracks in the metal at the bend which may give rise to leakage of air from the tire.

The present invention has for its object the solution of the problem of overcoming the defects heretofore encountered with valve stems intended for tubeless tire truck and bus tire rims, and more particularly to provide for such tire rims a one piece valve stem, the radial height of the base end portion of which is reduced to a minimum.

The foregoing and other objects of the invention, not specifically enumerated, I accomplish by providing a valve stem adapted for attachment to a truck or bus tire rim for a tubeless tire, said valve stem comprising a base portion and an integral tubular shank portion of smaller diameter than the base portion, said base portion being adapted to extend through a valve stem hole in a rim, the top of the base portion forming with the inner end of the shank portion an annular groove such that, when the shank portion is bent at substantially a right angle, one leg of the bend will extend below the top of the base portion and into the annular groove. The valve stem also has a flange at one end of the base portion adapted to seat against a face of a tire rim, such seating face being formed with an annular groove for accomodating an O-ring washer. The end of the base portion opposite the flange is preferably screw-threaded and adapted to accommodate a clamping nut for securing the valve stem to a rim.

The invention will be readily understood from the detailed description which follows, when considered in connection with the accompanying drawings, wherein.

Figure 1:
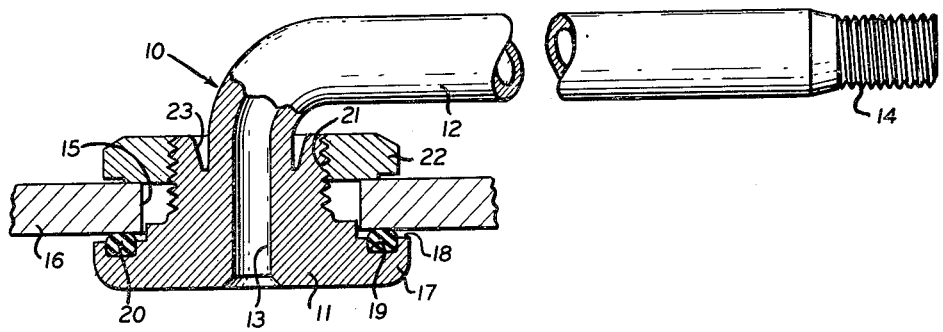
FIGURE 1 shows a diametrical section through a valve stem embodying the invention, a part of the shank portion of the stem being shown in elevation.
Figure 2:
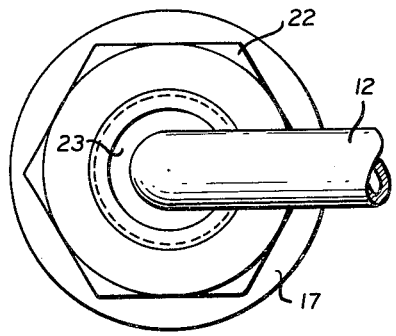
FIG. 2 is a fractional top plan view of the valve stem shown in FIG. 1.

Referring first to FIGS. 1 and 2 of the drawings, the valve stem 10 may be said to consist of a base portion 11 and an integral tubular shank portion 12 of smaller diameter than the base portion. The base portion is formed with a central bore or passageway 13 therethrough which continues through the tubular shank portion, which latter is formed at its free end with a reduced, externally threaded nipple 14.

The base portion 11 is of a length to extend through a valve stem hole 15 in a tire rim 16 and is formed at its free end with an enlarged flange 17, the inner face 18 of which is formed with an annular groove 19 adapted to accommodate an O-ring washer 20 adapted to seat against the tire face of rim 16. The body of the base portion is of a diameter to snugly engage within the rim hole 15 and is formed with a reduced, externally threaded part 21 adapted to accommodate a clamping nut 22.

At the juncture of the shank portion 12 with the base portion 11 at the top thereof, said base portion is trepanned to provide an axially extending annular groove 23 to enable the tank portion to be bent with a minimum radius at substantially a right angle to the base portion so that the shank portion will lie relatively close to the rim and thus permit the use of a larger diameter brake band on the wheel which carries the rim. The tubular shank 12, when so bent, will have one leg of the bend extending below the top of the base portion 11, as will be apparent from an inspection of FIG. 1.

Figure 3:
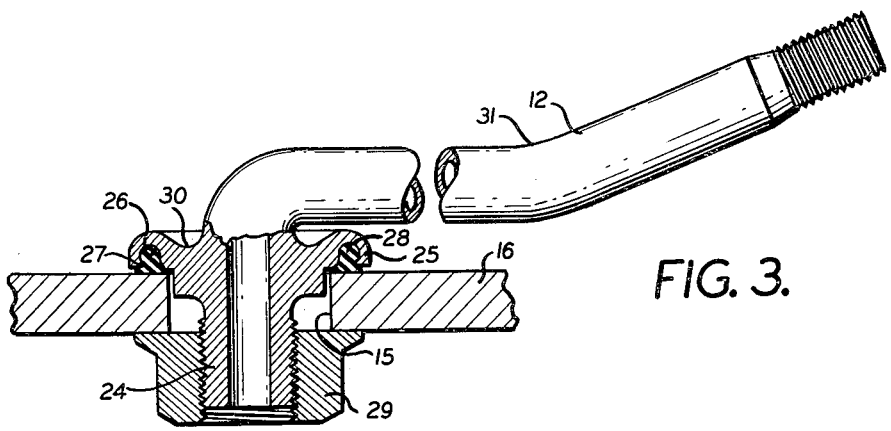
FIG. 3 is a view similar to FIG. 1 showing another embodiment of the invention.

In the embodiment of the invention shown in FIG. 3, the base portion 24 is formed at its end adjacent the shank portion with a flange 25 formed with an annular groove 26 having an inturned lip 27, within which groove is positioned and held an O-ring washer 28 adapted to engage the inner face of the rim 16. The free end of the base portion is formed of reduced diameter and is externally threaded to accommodate a clamping nut 29. Like the embodiment shown in FIG. 1, the embodiment shown in FIG. 3 is also trepanned at the top of the base to provide an annular groove 30 to enable the shank portion to be bent with a minimum radius at substantially a right angle with respect to the base portion so as to present the shank portion close to the outer face of the tire rim. As is conventional in many truck and bus tire valve stems, the shank portion 12 may be formed with a second bend 31.

It will be seen from a consideration of the embodiments of the invention shown, that the axial length of the base portion can be reduced to a minimum by virtue of the fact that the top of the base portion is trepanned so as to start the bend in the shank portion below the top of said base portion. It will also be appreciated that by use of locking washer such as 22 in FIG. 1 and 28 in FIG. 3 in conjunction with the deformable O-rings 20 and 28 that when either valve stem is locked onto a rim it will not become loosened or give rise to leakage due to vibration, which will be absorbed by the combination of the locking washer and the gasket.

While there has been shown and described two preferred embodiments of the invention, it is to be understood that changes in details of construction may be resorted to within the range of mechanical skill, without departing from the spirit of the invention as hereinafter claimed.

What I claim is:

1. A valve stem for attachment to a tubeless tire rim, said valve stem comprising a tubular shank portion and an enlarged base portion integral with the shank portion and of an axial length to have a part thereof inserted into and extend through a valve stem hole in a tire rim, said base portion being formed with an axially extending annular groove at the juncture of the base portion with the inner end of the shank portion, said groove being of a depth to enable the shank portion to be bent at a minimum radius to the base portion, and said base portion being formed at one end with an annular flange adapted to seat against a face of a tire rim and at the other end is externally screw threaded and adapted to accommodate a clamping nut for engaging the other face of the rim.

2. A tire valve stem according to claim 1 wherein the face of the flange adapted to seat against the face of a tire rim is formed with an annular groove for an O-ring washer.

3. A tire valve stem according to claim 1 wherein the flange is at the free end of the base portion and a groove is formed in the face of the flange intended to lie adjacent the tire face of the rim.

4. A tire valve stem according to claim 1 wherein the flange is spaced inwardly from the free end of the base portion and a groove is formed in the face of the flange intended to lie adjacent the inner face of the rim.

5. A tire valve stem according to claim 4 wherein an O-ring washer is held within the groove in the flange.

References Cited in the file of this patent

UNITED STATES PATENTS

| | | |
|---|---|---|
| 2,309,786 | Porter | Feb. 2, 1943 |
| 2,481,404 | Donner | Sept. 6, 1949 |
| 2,685,907 | Waddell | Aug. 10, 1954 |
| 2,813,568 | Kilmarx | Nov. 19, 1957 |
| 2,835,305 | Boyer | May 20, 1958 |
| 2,837,134 | Steer | June 2, 1958 |

FOREIGN PATENTS

| | | |
|---|---|---|
| 574,520 | Germany | Apr. 13, 1933 |